E. C. DAVEY.
ROLLER BEARING.
APPLICATION FILED MAR. 21, 1914.
1,187,271.
Patented June 13, 1916.
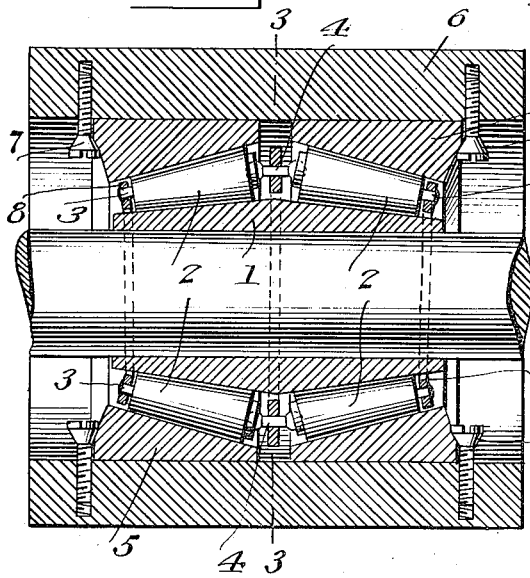
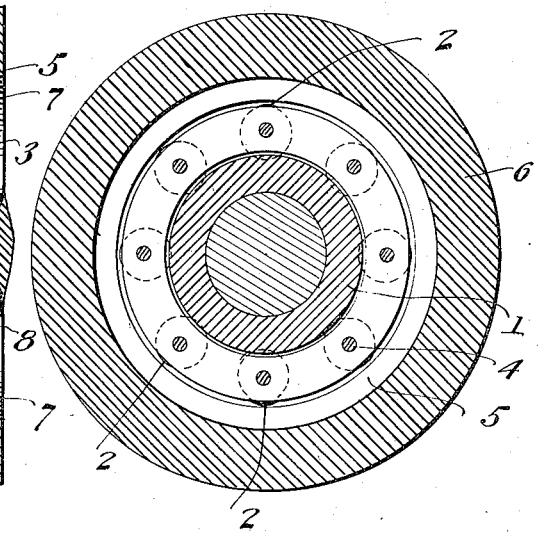
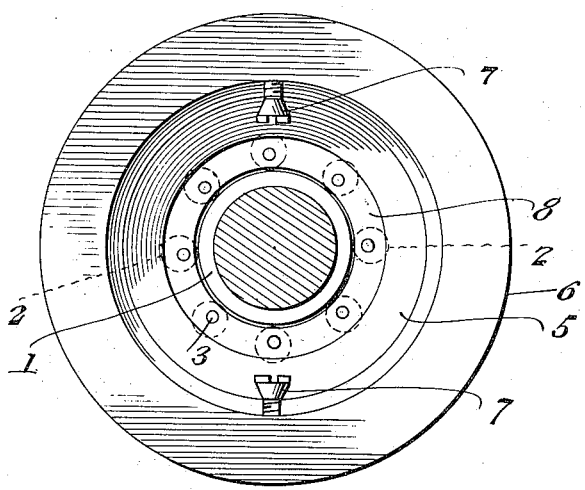
Witnesses
H. B. Byrd.
V. B. Hillyard.
Inventor
Elijah C. Davey
By Victor J. Evans
Attorney

UNITED STATES PATENT OFFICE.

ELIJAH C. DAVEY, OF CHICAGO, ILLINOIS.

ROLLER-BEARING.

1,187,271.  Specification of Letters Patent. Patented June 13, 1916.

Application filed March 21, 1914. Serial No. 826,336.

*To all whom it may concern:*

Be it known that I, ELIJAH C. DAVEY, a citizen of the United States, residing at Chicago, in the county of Cook and State of Illinois, have invented new and useful Improvements in Roller-Bearings, of which the following is a specification.

The invention provides a roller bearing specially designed for use in connection with heavy machinery but which may be adapted for general use.

The invention consists of a bearing sleeve having its end portions oppositely tapered, rings encircling the tapered ends of the bearing sleeve and having their inner faces tapered or inclined at a different angle to the inclination of the tapered ends of the bearing sleeve, two sets of tapered rollers arranged between the tapered ends of the bearing sleeve and the rings, said tapered rollers being connected by means of gimbal joints, retainers for the rollers, a barrel encircling the rings and adjusting means for such rings to maintain close fit between the several parts so as to prevent any lost motion or play.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a central longitudinal section of a roller bearing embodying the invention. Fig. 2 is an end view. Fig. 3 is a section on the line *x—x* of Fig. 1.

Corresponding and like parts are referred to in the following description and indicated in all the views of the drawings, by the same reference characters.

The bearing sleeve 1 has its end portions oppositely inclined, the tapered ends being symmetrical from a medial line toward the extremities of the sleeve. Tapered rollers 2 are mounted upon the tapered ends of the bearing sleeve 1 and are provided at their ends with journals 3. The inner journals of the rollers are connected by means of gimbal joints 4 this being necessary because of the opposite inclination of the axis of the rollers. By having the rollers of two sets jointed outward displacement is prevented and the rollers are held in a given position. Rings 5 encompass the set of rollers. The outer side of each of the rings is of universal diameter whereas the inner side inclines, the inclination being such as to correspond with the inclination of the elements of the rollers in contact therewith. The inclination of the tapered ends of the bearing sleeve 1 likewise corresponds with the elements of the tapered rollers 2 in contact therewith. By reason of the rollers being tapered it is understood that the opposing sides of the rings 5 and bearing sleeve 1 have a different relative inclination. A barrel 6 encircles the rings 5 and retains them in place. Diametrically disposed adjusting devices 7 are fitted to the barrel 6 to engage the outer ends of the rings 5 to admit of moving such rings inward to insure a close fit between the parts 1, 2 and 5. The adjusting devices 7 are shown as wedges which are adapted to be secured to the inner side of the barrel 6 in any manner to admit of their adjustment to effect lateral movement of the rings 5.

The bearing sleeve 1 admits of the roller bearing receiving a shaft, journal or like part and the barrel 6 provides for the adaptation of the roller bearing to the hub of a wheel or other part. Retainers 8 are fitted to the journals of the rollers and assist materially in holding the rollers in place, such retainers being in the form of rings.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown in merely illustrative, and that such changes may be made when desired as are within the scope of the claim appended hereto.

Having thus described the invention what is claimed as new is:—

A roller bearing comprising a bearing sleeve, rollers mounted upon the bearing sleeve, rings encircling the rollers and disposed in spaced relation one to the other and each provided with an inwardly beveled end, a cylindrical member encircling the rings, and diametrically disposed headed adjusting devices fitted to the inner walls of the cylindrical member at a point adjacent the opposite ends thereof with the head of the adjusting devices engaging the inwardly beveled ends of the rings for effecting inward movement thereof.

In testimony whereof I affix my signature in presence of two witnesses.

ELIJAH C. DAVEY.

Witnesses:
DARWIN SEYMOUR,
W. A. HEFFERNAN.